Oct. 16, 1951 L. FRANK 2,571,436
RIVET FEEDING TOOL
Filed Jan. 15, 1949 3 Sheets-Sheet 1
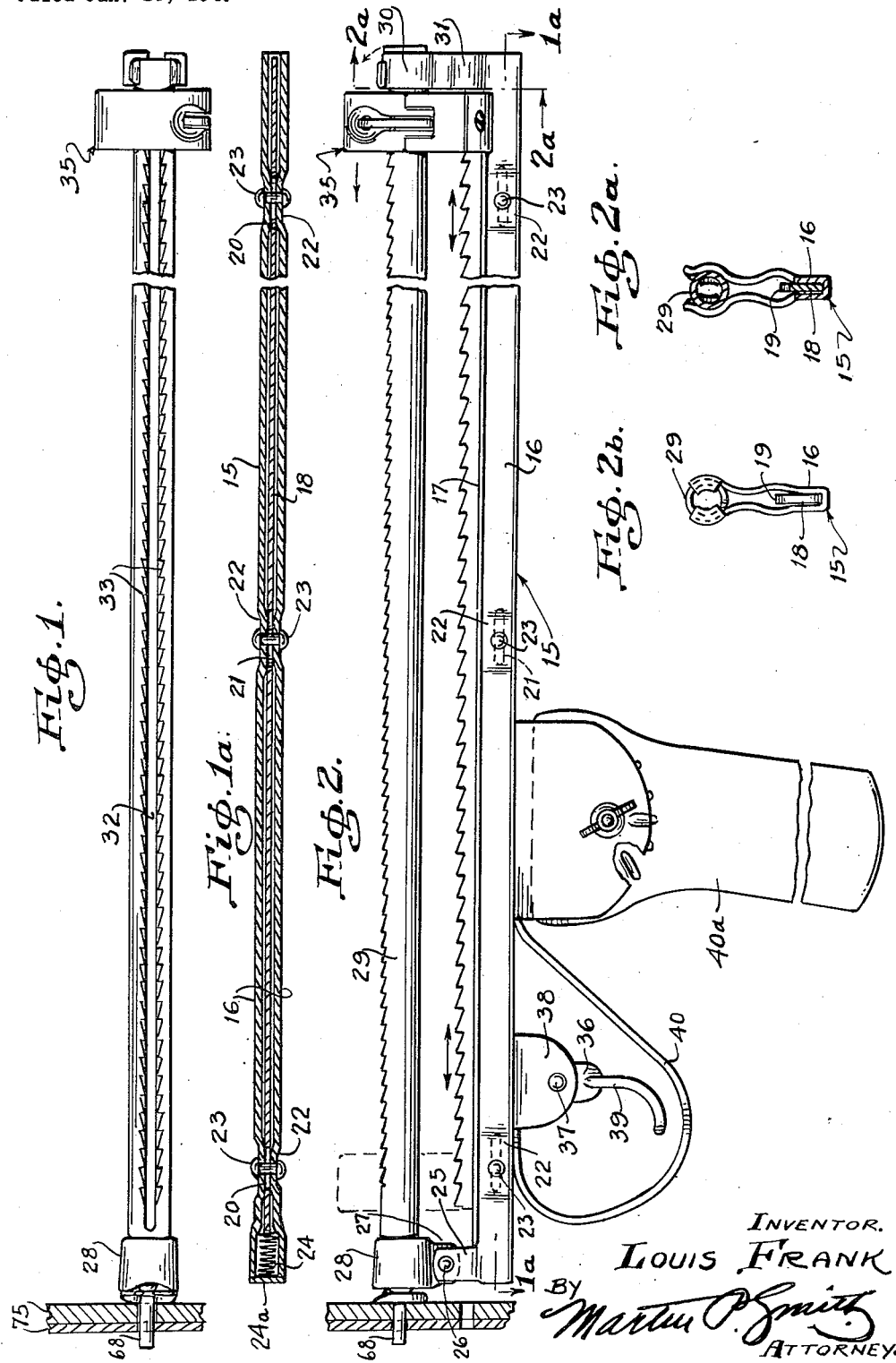
INVENTOR.
LOUIS FRANK
BY Martin P. Smith
ATTORNEY.

Oct. 16, 1951 — L. FRANK — 2,571,436
RIVET FEEDING TOOL
Filed Jan. 15, 1949 — 3 Sheets-Sheet 2
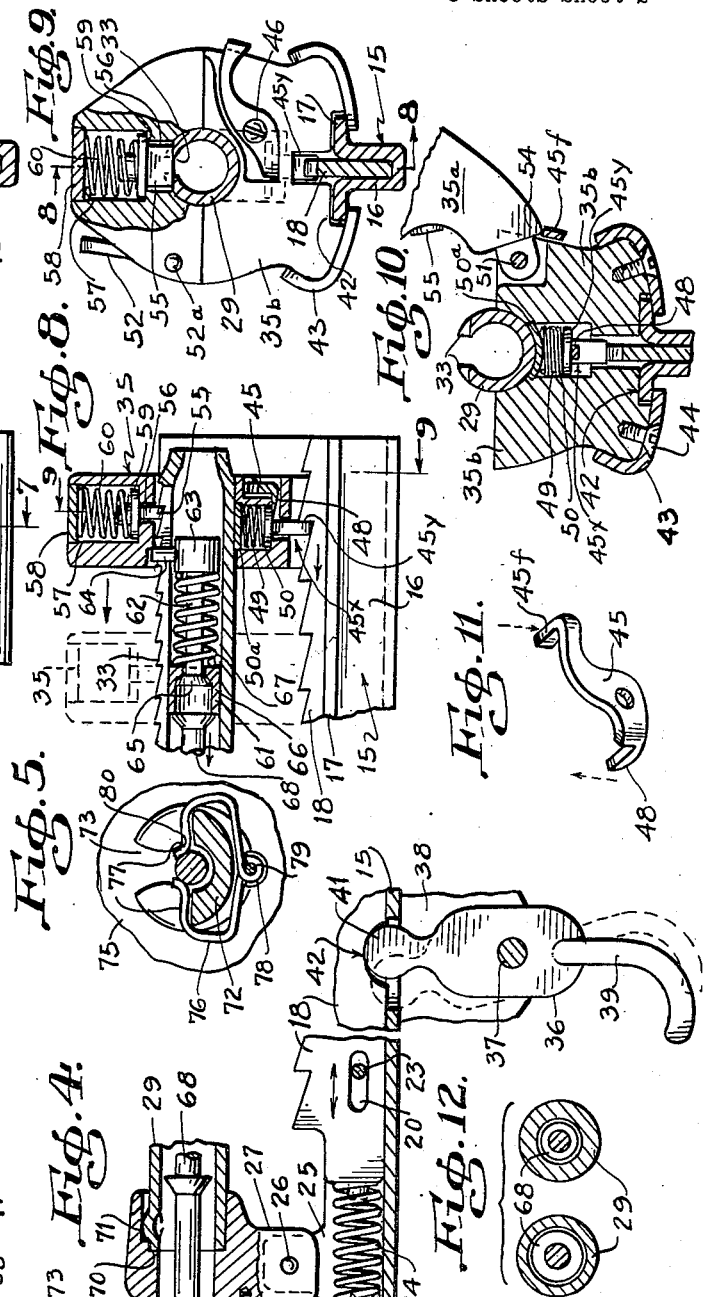
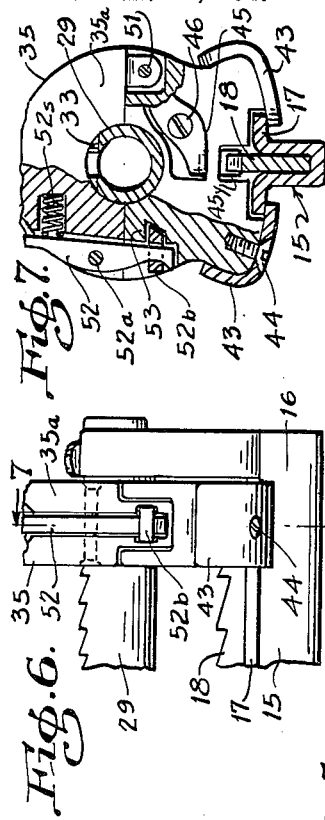
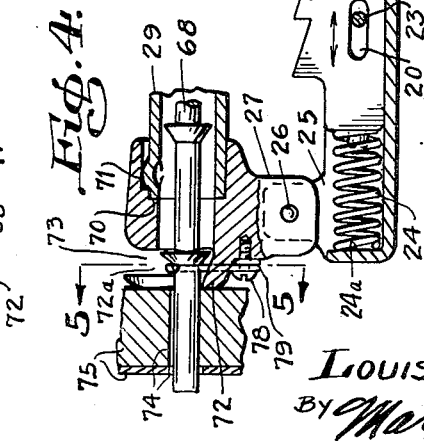
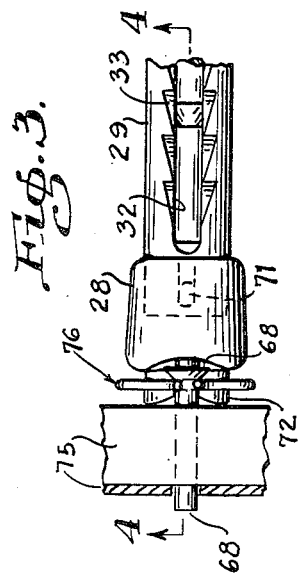
INVENTOR.
LOUIS FRANK
BY Martin O. Smith
ATTORNEY.

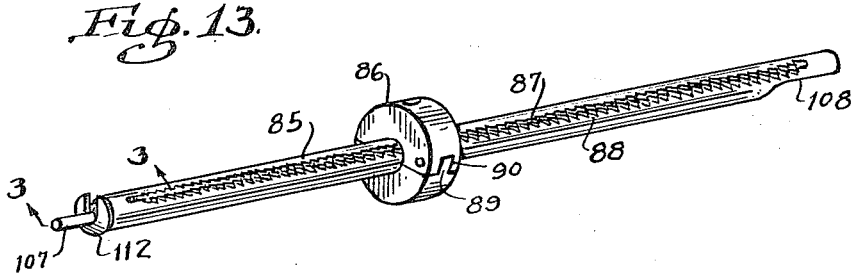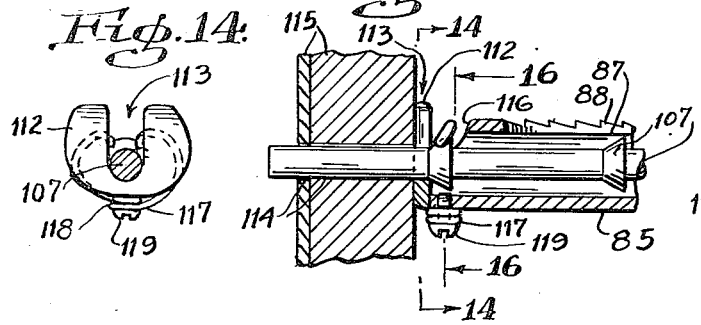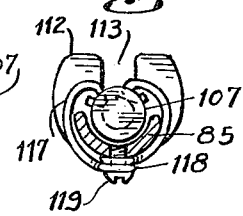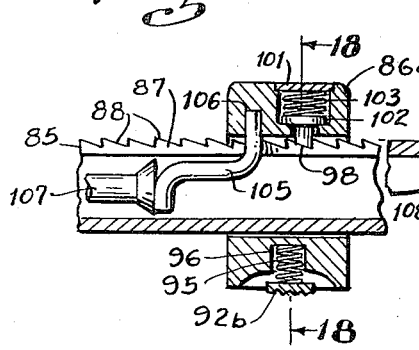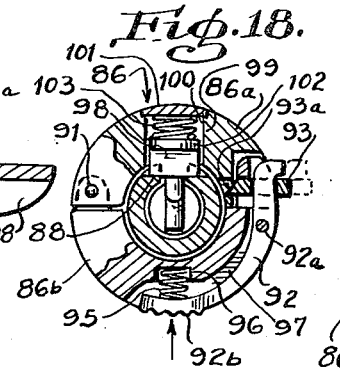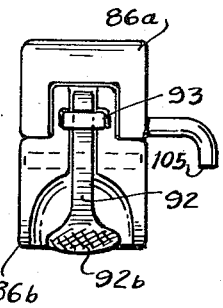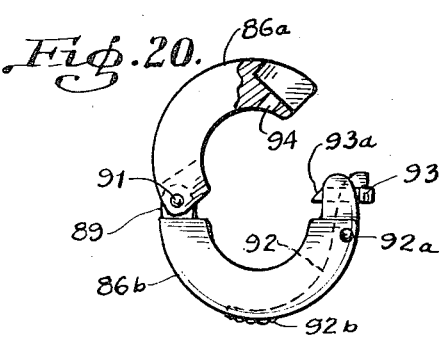

Patented Oct. 16, 1951

2,571,436

UNITED STATES PATENT OFFICE 2,571,436

RIVET FEEDING TOOL

Louis Frank, Fellows, Calif.

Application January 15, 1949, Serial No. 71,097

9 Claims. (Cl. 78—46)

This invention relates generally to rivet feeding tools and more specifically to a rivet feeding tool provided with magazine means capable of containing a considerable number of rivets in readiness to be fed singly into rivet holes, yet the entire tool being of a light portable character and sufficiently small, conveniently to be held in and operated by one hand of a workman, leaving his other hand free to attend to other matters.

Among the objects of the invention are: to provide a rivet feeding tool having a rivet delivery portion to which the rivets are singly conveyed and whereat each rivet is so positioned that the operator can use the tool positively to force it into a rivet hole before separating the tool from the rivet; to provide a small, manually operated rivet feeding tool capable of being used advantageously in conjunction with a supply of tubes each of which constitutes a rivet magazine, empty tubes being quickly and easily replaced in the tool with filled ones; to provide a tool capable of being advantageously used to handle many different sizes of rivets and of tubular rivet containers; to provide a tool of the kind stated which is better adapted to be used in any required position, hence being usable to insert the rivets into holes provided for them in overhead positions as well as in other positions; to provide improved trigger operable means for ejecting the rivets from the tool; and to combine with the aforesaid improved features the advantages of simplicity, durability and low cost of manufacture.

With the foregoing and other objects in view, my invention consists in certain novel features of construction, and arrangement of parts which will be hereinafter described and claimed and are illustrated in the accompanying drawings in which:

Fig. 1 is a top plan view of the complete tool, a sectioned fragment of a plate to which a rivet is being applied being included in the view.

Fig. 1a is a longitudinal section taken on the line 1a—1a of Fig. 2.

Fig. 2 is a side elevation of the complete tool, this view also including a sectioned fragment of a plate to which a rivet is being applied.

Fig. 2a is a cross section taken on the line 2a—2a of Fig. 2.

Fig. 2b is a rear end view taken on the line 2b—2b of Fig. 2.

Fig. 3 is an enlarged reproduction of the left hand end portion of Fig. 1, except that the plate fragment is shown in plan instead of in section.

Fig. 4 is a longitudinal section taken on the line 4—4 of Fig. 3, a fragment of the trigger-carrying part of the device being included in this view.

Fig. 5 is a cross section taken on the line 5—5 of Fig. 4.

Fig. 6 is an enlarged reproduction of the right hand end portion of Fig. 2, the object of the former view being to show small parts more clearly.

Fig. 7 is a view, partly in elevation and partly in section, of the rivet advancing member and adjacent structures, the sectioned portions of this view being on the plane of line 7—7 of Fig. 6. The upper part of said member is broken away to contract the view.

Fig. 8 is a section taken on the line 8—8 of Fig. 9, showing in full lines the position of the rivet advancing member at the beginning of its travel and in dotted lines the position of said member after it has been advanced a short distance by the series of ratchet teeth which cooperate therewith.

Fig. 9 is a part elevation and part section on the line 9—9 of Fig. 8.

Fig. 10 is a fragmental detail, partly in elevation and partly sectioned on the line 9—9 of Fig. 8. This view shows a fragment of the upper half of the rivet advancing member in its outswing position.

Fig. 11 is a perspective view of the ratchet driven dog of the rivet advancing member, which at times is in engagement with the teeth of the rack bar of Fig. 8 and at other times is disengaged from said teeth.

Fig. 12 shows, in cross section, two of the tubular rivet magazines which are mountable on the tool one at a time, one of these magazines containing larger rivets than the other.

Figs. 13 to 20 pertain to a modification wherein Fig. 13 is a perspective view of the complete tool on a smaller scale than Figs. 14 to 20.

Fig. 14 is a cross section on line 14—14 of Fig. 15.

Fig. 15 is a fragmental longitudinal section on the line 15—15 of Fig. 13 including a fragment of a rivet receiving plate.

Fig. 16 is a cross section on line 16—16 of Fig. 15.

Fig. 17 is a fragmental section of the rivet feed carriage and adjacent part of the rivet feeding tube, including a detached fragment of the rear end portion of said tube.

Fig. 18 is a cross section on line 18—18 of Fig. 17, except that fragments are shown in elevation.

Fig. 19 is an elevation looking at the right hand side of the structure shown in Fig. 18.

Fig. 20 is a side elevation of the annular rivet feeding carriage, except that a fragment is shown in section better to illustrate the locking means. The swingable segment of the annulus is shown in its outswung position.

Referring in detail to the drawings, one of the main parts of the illustrated embodiment of the invention is the elongated base bar 15 consisting of strip of form retaining sheet material bent along its mid-width into a narrow U-shape as viewed in cross section, both side portions 16 of said strip being right-angularly outbent to form flanges 17 along the open end of the U. Within the space between said sides 16 is mounted with a loose working fit, a rack bar 18 carrying a row of ratchet teeth 19 spaced somewhat above said flanges 17.

Said rack bar 18 is shown having through each of its end portions a short longitudinally extending slot 20 and at about its mid-length a like slot 21. As clearly shown at 22, in Figs. 1a and 2, the side walls 18 of the U are slightly impressed from each side at three points corresponding in spacing and position to the locations of said three slots through the rack bar 18; and rivets 23 pass through these impressed parts and also through said slots. Said rivets have loose working fits in said slots and the slots are long enough to allow for the hereinafter described reciprocatory movement of said rack bar. A coiled compression spring 24, abutting against the closed end 24a of the base bar, plays a part in the reciprocation of said rack bar.

From the front end of the aforesaid base bar 15 upstands a pair of spaced apart lugs 25 carrying a pivot pin 26 to which is pivoted the radial ear 27 of a short sleeve 28. Said sleeve is dimensioned to have removably fitted into it the delivery end portion of a tubular rivet carrier or rivet magazine 29 which extends substantially the entire length of the tool and the opposite end portion of which seats upon a saddle member 30 carried by a short arm 31 which upstands from, and may be integral with, the adjacent end portion of the base bar 15. Said rivet carrying tube 29, viewed in its mounted position, has a slot 32 along its upper side extending nearly its entire length, said tube being provided with a row of ratchet teeth 33 along each side of said slot.

A rivet feeding carriage 35 is mounted upon the base bar 15 to be propelled therealong in a step-by-step fashion, by means of the aforementioned reciprocatory rack 18. Said rack, in turn, is repeatedly shifted forwardly (see Fig. 12) against the opposition of the aforesaid spring 24, by means of a trigger-operated member 36 rockably mounted upon a pivot 37 carried between the two sides of a bifurcated bracket 38 which projects downwardly from the front end portion of the base bar 15. Said member 36 carries a trigger 39 protected by a guard 40 carried by the base bar 15. Said trigger operated member 36 has a head 41 of a circular shape as seen in side elevation, said head cooperating with a semi-circular notch 42 in the lower edge of the rack bar 18 to enable the trigger operated member 36 to move said rack bar forwardly each time said trigger is actuated.

Mounted on the underside of the base bar 15, rearwardly of the trigger guard 40, is an adjustable pistol grip handle 40a which is grasped by the operator's hand.

The pins 23 cooperate with the slots 20 and 21 in said rack bar to limit the forward movement of said rack bar and also to limit the spring retracted movement thereof. Said slots should each be somewhat longer than the space between the points of adjacent teeth 19 of the rack bar so as to insure that the rack bar is advanced, each time the trigger is fully retracted, at least the distance between adjacent teeth thereof.

The rivet feeding carriage 35 comprises an upper section 35a and a lower section 35b, the aforesaid flanges 17 of the base bar 15 forming a track along which said section 35b travels. Said section 35b is provided with an angular groove 42 along each side of its mid-width to slidably receive the adjacent track flange 17. An angular keeper plate 43, secured in place by a screw 44, overlies each lower corner portion of the section 35b, the inner edge portions of these keeper plates slideably underlying the outer edge portions of the flanges 17, keeping the section 35b upon its track.

The lower section 35b of the member 35 carries a T-shaped spring pressed driven pawl 45x, the stem 45y of which is in an operative relation to the teeth 19 of the aforementioned rack bar 18. Also said section 35b carries a short lever 45 which is pivotally attached between its ends by a pivot screw 46. Said lever has a downwardly offset, laterally directed finger 48 normally depressed by the head (which it underlies) of said T-shaped pawl 45x, which in turn is depressed by a spring 49 contained in a recess 50 which also contains the head of said T-shaped pawl.

The aforesaid rivet feeding member 35 has its upper section 35a swingably attached to its lower section 35b by means of a hinge pin 51. In order releasably to lock said section 35a in its downswung position, a latch arm 52 is pivoted at 52a to said section 35a, the upper end of said latch arm (see Fig. 7) being normally out pressed by a spring 52s contained in a recess provided for it in said section 35a; and the lower end of said latch arm carries a locking lug 52b which normally occupies a locking recess 53 provided for it in the non-swingable lower section 35b. The upper end portion of said latch arm may be manually pressed in to release said locking lug.

When said section 35a is out-swung to the limit of its swinging movement as shown in Fig. 10, its heel portion 54 engages and depresses an angularly directed finger 45f carried by the adjacent end portion of the aforesaid lever 45, thus rocking said lever on its pivot 46 and causing its aforesaid finger 48 to lift the aforesaid pawl 45x from its operative relation to the rack bar 18, so that at such time the rivet feeding member 35 may be moved from left to right toward its starting position shown in Figs. 1 and 2.

The swingable upper section 35a of the rivet feeding member carries a holding pawl 55 (so termed to distinguish from the aforesaid driven pawl 45x) this holding pawl cooperating with the aforementioned ratchet teeth 33 of the rivet feeding tube to prevent undesired retraction of the rivet feeding member 35. Said pawl 55 operates in a slot 56 forming a downward continuation of a bore 57 closed at the top by a disc 58 tightly fitted into said bore. The pawl carries, in said bore, a circular head 59 against which presses the lower end of a coil spring 60, which normally keeps the pawl in engagement with the two rows of ratchet teeth 33.

An elongated rivet driver 61 is slideably contained within the aforesaid rivet feeding tube 29, said driver comprising an axial stem 62 having at one end a circular head 63 which has a loose working fit within the tube 29, this head carrying a radial pin 64 engaged by a slightly recessed portion of the member 35a (see Figs. 8 and 10) so that said pin 64 is utilizable to advance the rivet driver 60 toward the delivery end of said tube 29. The opposite end of said stem 62 carries a smaller head 65 to hold in place a cup shaped member 66 one end of which is closed except for a central circular aperture, this apertured part having a working fit along said stem. A compression spring 67, coiled loosely around said stem tends to keep said cup 66 in contact with said head 65. The latter head has a working fit within the tube 29 and its outer end engages the rear-most of the row of rivets 68 being fed from the tool, said spring equalizing the pressure upon the row of rivets in the tube.

The delivery end portion of the tube 29 is removably contained within the already mentioned sleeve 28, said sleeve being internally contracted throughout part of its length, thus forming an annular shoulder 70 against which the adjacent end of the tube 29 normally abuts. A small outpressed nodule 71 in the tube's wall gives it a friction tight fit within said sleeve.

At its front or rivet delivery end, the sleeve 28 carries a rivet holding disc 72 having extending downwardly into it a radial slot 73 through the rounded inner end portion of which the shanks of the rivets 68 are projected so that they extend into bores 74 of the plates 75 into which they are fed (see Fig. 4). Said disc 72 is axially spaced away from the adjacent end of the sleeve 28 to afford a clearance 72a for the head of each fed rivet, so that the tool, when positioned as indicated in Fig. 4, may have its delivery end portion moved downwardly, thus leaving the extruded rivet in the bore 74 in the plate 75. This part of the tool is completed by a rivet stabilizing wire spring 76 (see Fig. 5) having cooperating arms 77 to engage the fed rivets. This spring has a small coil 78 in its mid-length portion through which passes an attaching pin 79. Said arms 77 of the spring 76 occupy the aforesaid clearance 72a behind the radially slotted disc 72, and the extremities 80 of said arms are outbent and slightly spaced apart as shown in Fig. 5 to adapt them yieldingly to engage both the shank and underside of the head of each successively fed rivet to guard against its premature delivery.

Assuming the rivet conveying tube 29 to be empty, preparatory to putting into operation the rivet feeding structure which has been described, the workman will press inwardly the upper end portion of the latch bar 52, carried by the upper carriage section 35a, thus releasing said section by releasing the latching tooth 53 (see Fig. 7) from the locking recess in which it is normally contained. Thereupon he will swing said section 35a to the open position indicated in Fig. 10, then he may swing the rear end of the tube 29 upwardly (owing to the front end of said tube being pivotally attached to the tool at 26), thus unobstructing the rear end of said tube so that a row of rivets can be fed into it from that end. Or he may completely remove said tube (its front end is loose in sleeve 28), and replace it with a rivet filled tube. In either case, it is obvious that the tube may be replaced in the operative position shown in Fig. 2, and the upper carriage section 35a then swung down to locked position.

At the time when the tube 29 is refilled or replaced in the already stated manner, it may be that the carriage 35 has been advanced to a point near the delivery end of the tool, as indicated in dotted lines in Fig. 2. If such be the case, said carriage may, while its upper section 35a is fully out-swung, be moved back to its starting position without the ratchet teeth 19 of the base bar interfering with such backward movement, because, as shown in Fig. 10, the heel 54 of the fully out-swing section 35a then engages the outer end portion 45f of the pawl 45, freeing the opposite end portion of said pawl from the ratchet teeth 19 of the base bar; and, of course, at this time the pawl 55 carried by the swingable section 35a is also released from the two rows of ratchet teeth 33 bordering the slot 32 of the tube 29.

The manner of operating the tool to deliver the extruded rivets from the front end of the tube 29 has already been indicated in describing the radially slotted disk 72 and parts adjacent to it at that end of said tube. To regulate properly the advance of the rivets the operator has only to increase or decrease pressure on the trigger each time it is retracted.

Describing now the modification shown in Figs. 13 to 20, a slightly modified rivet containing tube 85 is provided, and slideably mounted thereon to travel therealong is an annular rivet feeding carriage 86. Said tube 85 has a straight longitudinal slot 87 extending through one side of the wall thereof, the ends of said slot being slightly spaced away from the ends of said tube. Along each side of said slot is a row of ratchet teeth 88 the points of which are directed toward the delivery end of the tube, which is its left end as viewed in Fig. 1.

The aforesaid carriage 86 is constructed as an annulus with two semi-circular segments 86a and 86b, the segment 86b carrying at one of its ends a lug 89 which cooperates with a radial slot 90 in the section 86a and a hinge pin 91 to hinge together the two semi-circular segments which make up the annular member 86. The side portion of the segment 86b opposite to said hinge pin carries an arcuate latch arm 92 pivoted at 92a adjacent to its latching end. Said arm 92 carries a locking element 93 having a point portion 93a adapted to engage a locking shoulder 94 formed on that end portion of the segment 86a which is farthest from the hinge pin 91.

The lower end portion of latch arm 92 is broadened at 92b and is provided with a pebbled outer surface to facilitate its manual depression to unlock the latch arm against the opposition of a coiled compression spring 95, the upper end portion of said spring being contained in a recess 96 which opens downwardly into the lower end portion of an arcuate groove 97 provided to receive the latch arm 92.

The upper section 86a of the member 86 carries a pawl 98 cooperating with the aforementioned ratchet teeth 88 of the rivet feeding tube to prevent undesired retraction of the rivet feeding member 86. Said pawl 98 operates in a slot 99 forming a downward continuation of a bore 100 closed at the top by a disk 101 tightly fitted into said bore. Said pawl carries within said bore a flat topped circular head 102 against which presses the lower end of a coil spring 103, which normally keeps the pawl in engagement with said ratchet teeth 88.

An approximately S-shaped rivet driving arm 105 has an upper end portion contained in a bore 106 provided for it in the interior portion of the semi-circular segment 86a, said arm normally passing through the slot 87 so that the lower end portion of the arm is positioned to act as a rivet feeding follower, in Fig. 7, said arm being shown in engagement with the head of the rearmost of the row of rivets 107 contained within the rivet feeding tube 85.

The rear end portion of said tube 85 is shown semi-circularly cut away for a short distance at 108, to facilitate filling the row of rivets 107 into the tube. This cut-out is located diametrically opposite to the slot 87 of the tube. At the opposite (the front) end, said tube carries a rivet holding disk 112 having extending downwardly into it a radial slot 113 through the rounded inner end portion of which the shanks of the rivets 107 are projected so that they extend into the bores, 114 of the plate 115, a fragment of which is shown in Fig. 3. The tube 85 has a semi-circular notch 116 cut into the upper side of its front end adjacent to said disk, thus providing a clearance so that the head of a rivet positioned as shown in Fig. 3 will not interfere with a downward withdrawal of the delivery end of the tube 85 therefrom. The lower portion of the slotted disk 112 contacts with the end of the tube 85 and is welded or otherwise secured thereto.

In order to stabilize the rivets at the time of their delivery, a wire spring 117 is provided at the delivery end of the tube 85, said spring being bent into an approximate ellipse with a gap in its upper side, the long axis of said ellipse extending horizontally and transversely of said tube 85. Said spring is shown having a curl 118 in its mid-length portion through which passes an attaching screw 119 tapped into the lower side of the tube 85. Said spring is provided at each end with a downwardly directed curl 120 so positioned as to engage yieldingly the head of each rivet during its delivery in a manner to prevent the premature separation of the rivet from the tube.

The operation of both embodiments of the invention can be quickly grasped by an unskilled workman.

The operation of the modification shown in Figs. 13 to 20 will for the most part be readily understood from what has already been said about operating the first described embodiment; but, it should be added that in operating said modification, the workman will apply his hand directly to the carriage 86 to advance it toward the delivery end of the tool, thus causing the rivet driver arm 105 to push the rivets toward the delivery end of the tube 85. Also, in reloading rivets into said tube, it will be held with its rear end highest and the cut-out 108 directed upwardly to facilitate the in-feeding of the rivets.

The carriage 86, when its latch 92 is released, may be completely removed from the tube 85, hence the rivet driving arm 105, may then be lifted vertically out of the tube from the position of said arm shown in Fig. 5.

I claim:

1. In a rivet feeding tool, a tube adapted to contain a row of rivets to be delivered from one end thereof in an end-wise manner, said tube being adapted to have rivets supplied to the interior thereof in an end-to-end row, a disk carried by the rivet delivery end portion of said tube, said tube and disk being slightly spaced axially apart, said disk having a radial slot slightly greater in width than the shanks of the fed rivets and less in width than the heads of said rivets, said slot extending downwardly into the disk when the tool is in its operative position, thus adapting said disk to restrain the rivets against premature delivery from said tube as they are fed therefrom, said tube having through its side wall a longitudinal slot, a carriage mounted on said tube and movable therealong, means operatively connecting said carriage with the interior of the tube to advance a row of rivets therein when said carriage is advanced, ratchet teeth carried by said tube at times to prevent retrograde movement of said carriage, and a pawl carried by said carriage in an operative relation to said ratchet teeth.

2. The subject matter of claim 1, and said ratchet being formed in that portion of said tube which borders said slot.

3. The subject matter of claim 1, and said ratchet being in two rows, one row along each side of said slot.

4. The subject matter of claim 1, and said carriage being annularly shaped and in two arcuate hinged together sections, said carriage being removable from said tube when said sections are outswung from each other, and locking means carried by said carriage releasably to lock said sections in their in-swung relation.

5. In a rivet feeding tool, a tube adapted to contain a row of rivets to be delivered from one end thereof in an endwise manner, said tube being adapted to have rivets supplied to the interior thereof in an end-to-end row, said tube having a longitudinal slot extending through the side thereof, rivet driving means mounted within said tube for movement therealong to advance a row of rivets therein toward the delivery end of the tube, a carriage mounted in part on said tube to travel therealong, there being an operative connection between said rivet driving means and said carriage so that advance movement of the latter advances the former also, a base bar underlying said tube and normally in a parallel, adjacent relation thereto, supports for said tube normally connecting the ends thereof with the ends of said base bar, a reciprocatory rack bar overlying said base bar between it and said tube, a spring positioned to oppose shifting said base bar toward the delivery end of said tube, a pawl carried by said carriage and engaging said base bar, and manually operable means repeatedly to shift said rack bar against the opposition of said spring to cause said carriage to advance the aforesaid rivet driving means in a step-by-step fashion toward the delivery end of said tube.

6. The subject matter of claim 5, and said manually operable means comprising a trigger operable member pivotally supported by said base bar subjacent thereto carrying a trigger at one side of its pivot and at the opposite side thereof a part operatively related to said rack bar.

7. In a rivet feeding tool, a base bar having upstanding end portions, a tube adapted to contain a row of rivets to be delivered from one end thereof in an endwise manner, said tube being swingably connected to one of the upstanding end portions of said base bar, the other upstanding end portion of said base bar affording a seat upon which the free end portion of said swingable tube normally rests, a part of said seat forming a closure for the end portion of the tube resting thereon, that end of the tube being open except for such closure, a rivet driver within said tube to advance the row of rivets therein, a carriage having a lower section mounted on said base bar to travel therealong, said carriage section having an upper section hinged to it, the latter section normally overlying said tube and being movable therealong, said tube having a longitudinal slot in its upper side portion, there being a connection which extends through said slot and operatively connects said upper carriage section with said rivet driver so that advancing said carriage also advances said rivet driver, and manually releasable locking means between the two sections of said carriage which when unlocked permits an upswing of said upper carriage section, thus also permitting the upswing of the aforesaid seat supported end of said tube so that a supply of rivets may be fed into said opened end of said tube.

8. In a rivet feeding tool, a tube adapted to contain a row of rivets to be delivered from an end thereof in an end-wise manner, said tube being adapted to have rivets supplied to the interior thereof in an end-to-end row, said tube having a longitudinal slot extending through the side thereof, a carriage mounted upon the tool in a position to travel along said tube, means connecting said carriage with the interior of said tube so that advance of the carriage along the tube advances the row of rivets therein, and a wire spring carried by the delivery end portion of said tube, said spring having a rivet restraining arm at each end, said spring being shaped as a loop with a gap at one side, one of said arms being located at one side of said gap and the other arm being located at the opposite side of said gap.

9. In a rivet feeding tool, a tube adapted to contain a row of rivets to be delivered from one end thereof, in an endwise manner, said tube being adapted to have rivets supplied to the interior thereof in an end to end row, a disk carried by the rivet delivery end portion of said tube, said tube and disk being slightly spaced axially apart, said disk having a radial slot slightly greater in width than the shanks of the fed rivets and less in width than the heads of said rivets, said slot extending downwardly into the disk when the tool is in its operative position, thus adapting said disk to restrain the rivets against premature delivery from said tube as they are fed therefrom, manually operable means carried by said tube to advance the row of rivets therein in a step by step fashion toward the delivery end of the tube, said tube having a longitudinal slot in its side and said manually operable rivet advancing means comprising a carriage mounted on said tube and movable therealong, a part of said carriage extending into said tube, into a position to engage the rear end of a row of rivets therein.

LOUIS FRANK.

REFERENCES CITED

The following references are of record in the file of this patent:

UNITED STATES PATENTS

| Number | Name | Date |
|---|---|---|
| 2,337,506 | Tea | Dec. 21, 1943 |
| 2,373,509 | Speth | Apr. 10, 1945 |
| 2,397,872 | Kovacs | Apr. 2, 1946 |
| 2,416,474 | Frank | Feb. 25, 1947 |
| 2,445,026 | Frank | July 13, 1948 |